US007643092B2

(12) United States Patent
Kasamatsu

(10) Patent No.: US 7,643,092 B2
(45) Date of Patent: Jan. 5, 2010

(54) BROADCAST RECEIVING SYSTEM

(75) Inventor: Hideki Kasamatsu, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 579 days.

(21) Appl. No.: 10/557,701

(22) PCT Filed: May 19, 2004

(86) PCT No.: PCT/JP2004/006729

§ 371 (c)(1),
(2), (4) Date: Nov. 22, 2005

(87) PCT Pub. No.: WO2004/107745

PCT Pub. Date: Dec. 9, 2004

(65) Prior Publication Data

US 2007/0064157 A1    Mar. 22, 2007

(30) Foreign Application Priority Data

May 29, 2003    (JP)    ............................. 2003-151978

(51) Int. Cl.
 *H04N 5/45* (2006.01)
(52) U.S. Cl. ........................ 348/565; 348/730; 348/723; 348/553
(58) Field of Classification Search ................. 348/734, 348/725, 726, 731, 552–570, 706, 705; 725/81, 725/82, 78, 80
See application file for complete search history.

(56) References Cited

U.S. PATENT DOCUMENTS 6,263,503 B1 *  7/2001  Margulis ..................... 725/81
6,759,967 B1 *  7/2004  Staller ..................... 340/825.72

FOREIGN PATENT DOCUMENTS

| JP | 8-79720 | 3/1996 |
| JP | 10-248020 A | 9/1998 |
| JP | 11-196345 A | 7/1999 |
| JP | 2002-034023 A | 1/2002 |
| JP | 2002-158888 | 5/2002 |
| JP | 2002-158889 | 5/2002 |
| JP | 2003-087673 A | 3/2003 |

OTHER PUBLICATIONS

Translation of the International Preliminary Report on Patentability of International Application No. PCT/JP 2004/006729, with Form PCT/IPEA/409.
Translation of the International Preliminary Report on Patentability of International Application No. PCT/JP 2004/006729, with Form PCT/IPEA/409, filed May 19, 2004.

* cited by examiner

*Primary Examiner*—M. Lee
(74) *Attorney, Agent, or Firm*—Westerman, Hattori, Daniels & Adrian, LLP

(57) ABSTRACT

When a main television is turned on, a power source A, a power source B, and a power source C operate. When the main television is turned off (stand-by state), the power source A and the power source B operate, if the sub-television is turned on, and only the power source A operates, if the sub-TV is turned off. Therefore, even when the main television is turned off, as long as the sub-television is turned on, a broadcast reception process and a wireless video transmission to the sub-TV are performed. If both the main television and sub-television are turned off, then electric power supplies to circuits for the broadcast reception processes are stopped, and as a result, electric power consumption is saved.

7 Claims, 2 Drawing Sheets

BROADCAST RECEIVING SYSTEM

TECHNICAL FIELD

The present invention relates to a broadcast receiving system composed of a main television for receiving broadcast wave to display a video and outputting transmission radio wave of the received video and a sub-television for receiving the transmission radio wave from the main television to display a video.

BACKGROUND ART

Conventionally, there is known a main and sub-television set composed of a main unit provided with a broadcast receiving function, and a sub unit for displaying a video signal fed from the main unit on the display without the broadcast receiving function (see Japanese Patent Application Laying-open No.H8-79720).

DISCLOSURE OF THE INVENTION

Problem to be Solved by the Invention

However, in the above-described conventional main and sub-television set, the main unit is not provided with a display, so that it is not possible to view broadcast video on the main unit. In addition, although it has been conventionally possible that two programs are viewed on one television set by providing a plurality of tuners and a picture-in-picture function, it has not been possible to view television at two places in a building. On the other hand, it becomes possible to view television at two places in a building by connecting one television set and a separate monitor with a cable. However, since the television set and the separate monitor is connected with the cable, it is not possible to set up the separate monitor at a position far from the television set.

In view of the foregoing circumstances, an object of the present invention is to provide a broadcast receiving system capable of viewing broadcast both on a main television and a sub-television without equipping the sub-television with a tuner, as well as capable of continuing to view broadcast on the sub-television even when the main television is turned off.

Means to Solve the Problem

In order to solve the above-described problem, a broadcast receiving system of the present invention is formed of a main television unit provided with a receiving part for receiving broadcast wave, a signal processing part for generating at least a video signal based on the received broadcast wave, a display for displaying a video based on the video signal, and a means for generating at least a transmission radio wave of a video based on the received broadcast wave, and a sub-television unit provided with a receiving part for receiving the transmission radio wave, a signal processing part for generating at least a video signal based on the received transmission radio wave, and a display for displaying a video based on the video signal, in which the sub-television unit is provided with a means for transmitting information indicating a TV on-state of the sub-television unit by wireless, on the other hand, the main television unit is provided with a means for receiving the information indicating the TV on-state of the sub-television unit by wireless, and the main television unit stops displaying the video on the display thereof when being turned off, while continuing a broadcast reception process, a transmission radio wave generation process, and a reception process of sub-television information by wireless when receiving information indicating the TV on-state of the sub-television unit.

With the above-described configuration, it is possible to view broadcast both on the main television and the sub-television without equipping the sub-television with a tuner. Furthermore, even when the main television is turned off, it is possible to continue to view broadcast on the sub-television.

It is preferable that the main television unit stops the broadcast reception process and the transmission radio wave generation process, while continuing the reception process of sub-television information by wireless, when the main television is turned off and the information indicating the TV on-state of the sub-television unit is not received. According to this configuration, when the sub-television is turned off, the main television stops the broadcast reception process and transmitting wave generation process, while continuing a reception process of sub-television information by wireless. Therefore, when the sub-television is turned on again, the main television can determine that the sub-television was turned on.

It is preferable that the main television unit includes a plurality of power sources, and the power source used for supplying electric power to a power consumption element related to each of the processes stops electric power supply to the power consumption element when the processes are stopped. According to this, it is possible to restrain unnecessary electric power consumption in the main television.

It is preferable that the main television unit is provided with a plurality of tuners, and a selection means which includes a plurality of input terminals from which output signals from each of the tuners or signals generated on the basis of the output signals are input and is capable of outputting an arbitrary signal from an arbitrary output terminal. According to this, it is possible to view different programs on the main television and the sub-television at the same time.

Effect of the Invention

As described above, the present invention makes it possible to view broadcast both on the main television and the sub-television without equipping the sub-television with a tuner. In addition, even when the main television is turned off, it is possible to continue to view broadcast on the sub-television. Furthermore, it is possible to restrain unnecessary electric power consumption in the main television by controlling power supply by the power source.

BEST MODE FOR PRACTICING THE INVENTION

Hereinafter, a broadcast receiving system according to an embodiment of the present invention will be described with reference to FIG. 1 and FIG. 2. FIG. 1 is a block diagram showing structure of a main television unit (hereinafter referred to as a main TV (television)) and FIG. 2 is a block diagram showing structure of a sub-television unit (hereinafter referred to as a sub-TV).

In FIG. 1, a satellite antenna 1A receives satellite broadcast wave (BS and CS) and a terrestrial antenna 1B receives terrestrial wave. These antennas 1A, 1B apply received signals to tuners 2A, 2B, and 2C.

An analog terrestrial tuner 2C tunes in to RF (radio-frequency signal) from the antenna 1B and converts the signal to an intermediate frequency signal (IF). The tuner 2C is formed of being provided with a first stage amplifier for amplifying a received RF signal, an AGC amplifier for varying a gain by an external control voltage, a mixer for generating the IF signal which is a difference frequency between a local frequency generated by a voltage controlled oscillator and the received RF signal, a PLL circuit for controlling the voltage controlled oscillator to a predetermined fixed-frequency output state on the basis of a tuning data applied from a controller 3, a detection circuit, and others. The detection circuit detects intermediate frequency video signals to generate a NTSC signal and also detects intermediate frequency audio signals.

The above-described NTSC signal is converted to a digital signal by an A/D converter 4A and fed to an NTSC video decoder 5. In addition, the audio signals are converted to digital signals by an A/D converter 4B. The NTSC video decoder 5 generates a digital luminance signal Y and digital color signals Cb, Cr. An MPEG video encoder 6A inputs the above-described luminance signal Y and color signals Cb, Cr to generate a video stream of MPEG (Moving Picture Experts Group). An MPEG audio encoder 6B inputs a digital audio signal to generate an audio stream of the MPEG. A multiplexer 7 inputs the video stream and the audio stream to generate a transport stream.

A digital terrestrial tuner 2B is provided with a frequency selecting function similar to that of the above-described analog terrestrial tuner 2C, and additionally provided with a demodulation circuit, an inverse interleave circuit, an error correction circuit, etc., and demodulates the selected digitally modulated signal to output a transport stream.

A digital BS/CS tuner 2A is also provided with the frequency selecting function similar to that of the digital terrestrial tuner 2B as well as the demodulation circuit, an inverse interleave circuit, an error correction circuit, etc., and demodulates the selected digitally modulated signal to output a transport stream.

A matrix switch 8 performs processes such as inputting the transport stream output from the multiplexer 7 and the transport stream output from the tuners 2A, 2B, selecting one transport stream that is selected broadcast for the main TV itself, and feeding the transport stream to a demultiplexer 9 (DEMUX). In addition, the matrix switch 8 performs a process of selecting one transport stream for the sub-TV and feeding the transport stream to a communication controller 16. The matrix switch 8 is controlled by the controller 3.

The demultiplexer 9 separates the transport stream fed by the matrix switch 8 into the MPEG video stream, MPEG audio stream, PSI/SI (Program Specific Information/Service Information), and others. The demultiplexer 3 feeds the video stream to an MPEG video decoder 10A, the audio stream to an MPEG audio decoder 10B, and the PSI/SI and others to the controller 3. It is noted that a plurality of channels are multiplexed on a transport stream in a digital broadcast. Accordingly, it is possible to perform a process for selecting an arbitrary channel from the plurality of channels by extracting data indicating with which packet ID the arbitrary channel is multiplexed in the transport stream from the PSI/SI, for example. Furthermore, it is possible to make a selection of transport stream based on the PSI/SI.

The MPEG video decoder 10A decodes an input variable length code to evaluate a quantization coefficient and a motion vector, thereby carrying out inverse DCT, motion compensation control based on the motion vector, and the like. Output from the MPEG video decoder 10A is converted to digital RGB data by a matrix 11B. It is noted that output from the above-described A/D converter 4A (this output is the signal from the analog terrestrial tuner 2C) is converted to digital RGB data by a matrix 11A. Only one of the two RGB data is selected by a changeover switch 12A. The changeover switch 12A is controlled by the controller 3. The selected RGB data is converted to analog RGB signal by a D/A converter 13A and fed to a display 14.

The MPEG audio decoder 10B generates audio data by decoding input coded signal. The audio data generated by decoding is converted to audio signal by a D/A converter 13B. Only one of the audio signal generated via the D/A converter 13B and the audio signal from the analog terrestrial tuner 2C is selected by the changeover switch 12B. The changeover switch 12B is controlled by the controller 3. The selected audio signal is fed to a speaker 15. It is noted that the audio signal from the analog terrestrial tuner 2C is selected by the changeover switch 12B and video data via the A/D converter 4A and the matrix 11A is selected by the changeover switch 12A when analog terrestrial broadcast is viewed on the main TV.

The communication controller 16, a radio part 17, and an antenna 18 are component elements for transmitting the transport stream to the sub-TV and communicating with the sub-TV, and are formed of being provided with an error correction code addition circuit, a modulation circuit, and others. The error correction code addition circuit adds a parity-check code to a transport stream packet. The modulation circuit mixes the transport stream packet with a transmission radio wave at a predetermined bit rate by a digital modulation process. A communication content (information) with the sub-TV includes information from the sub-TV indicating ON/OFF of the sub-TV and the channel selection. It is noted that a configuration in which the main TV and the sub-TV are connected by a wireless LAN may be adopted.

A remote controller 20 is provided with various kinds of keys and transmits various kinds of commands to the main TV. When the keys are operated, signal light (remote control signal) indicating commands corresponding to the keys are transmitted from a light emitter not shown. A remote control light receiver not shown receives the signal light, converts the received signal light to an electronic signal, and applies the electronic signal to the controller 3. An operation key 21 is provided on a main body of the main TV and applies information on key operation by a user to the controller 3. A modem 22 is operated under control of the controller 3 in a dial-up connection when transmitting billing information of pay-broadcast and data in interactive data service, for example.

The controller 3 performs various kinds of control on the main TV, in particular, power supply control as a process related to the present invention. The main TV is equipped with a power source A, a power source B, and a power source C. The power source A supplies electric power to the controller 3, the modem 22, the communication controller 16, and the radio part 17. The power source B supplies electric power to the tuners 2A, 2B, and 2C, and a stream generation and selection system (the encoders 6A, 6B, the matrix switch 8, and others). Electric power is supplied from the power source B when the TV is viewed on the sub-TV (TV is turned on), even if the TV is not viewed on the main TV (stand-by state). The power source C supplies electric power to a video and audio generation system. Electric power is supplied from the power source C when the TV is viewed on the main TV.

The controller 3 controls the power source switch 23 and power source switch 24. When OFF control of the power source switch 24 is executed, only the circuits to which electric power is supplied from the power source A and the power source B operate. In addition, when the OFF control of the power source switch 23 and the power source switch 24 is executed, only the circuits to which electric power is supplied from the power source A operate. The controller 3 turns on the power source switch 23 and the power source switch 24 when a TV ON-operation is performed toward the main TV. The controller 3 turns off the power source switch 24 and determines an TV ON/OFF state of the sub-TV when an OFF-operation is performed toward the main TV. The determination is made by a communication determination part 3*a* in the controller 3. The communication determination part 3*a* determines that the sub-TV is turned on, when receiving a signal indicating that the sub-TV is turned on from the communication controller 16. The signal indicating that the sub-TV is turned on is transmitted from the sub-TV, when the TV ON-operation is performed toward the sub-TV. It is noted that the sub-TV may regularly transmit the signal indicating ON-state when the sub-TV is in the ON-state, and the main TV may be configured to determine that the sub-TV is turned off in a case where the main TV can not receive the signal indicating the ON-state for more than a certain period of time. The controller 3 maintains the ON-state of the power source switch 23 when determining the sub-TV is turned on. On the other hand, the controller 3 turns off the power source switch 23 when determining that the sub-TV is turned off. Even if the power source switch 23 is turned off, electric power supply from the power source A is maintained. The controller 3 turns on the power source switch 23 again when the communication determination part 3*a* determines that the sub-TV is turned on after the power source switch 23 was turned off.

The above-described content is simplified as follows:
1. When the main TV is turned on, the power source A, the power source B, and the power source C operate.
2. When the main TV is turned off (stand-by state)
   1) When the sub-TV is turned on, the power source A and the power source B operate.
   2) When the sub-TV is turned off, only the power source A operates.

Next, the sub-TV will be described with reference to FIG. 2. The digitally modulated transport stream transmitted by the main TV is received by an antenna 31, a radio part 32, and a communication controller 33. Transmission-use information (the ON/OFF information and the channel selection information of the sub-TV, and others) output from the controller 40 is transmitted via the communication controller 33, the radio part 32, and the antenna 31.

A demultiplexer (DEMUX) 34 separates the supplied transport stream into an MPEG video stream and MPEG audio stream, and the like. The demultiplexer 34 feeds the video stream to an MPEG video decoder 35A and feeds the audio stream to an MPEG audio decoder 35B. The MPEG video decoder 35A decodes an input variable length code to evaluate a quantization coefficient and a motion vector, thereby carrying out inverse DCT, motion compensation control based on the motion vector, and the like. Output from the MPEG video decoder 35A is converted to digital RGB data by a matrix 36. The RGB data is converted to analog RGB signal by a D/A converter 37A, and the analog RGB signal is fed to a display 38. The MPEG audio decoder 35B generates audio data by decoding input coded signal. The audio data generated by decoding is converted to an audio signal by a D/A converter 37B. The audio signal is fed to a speaker 39.

A controller 40 executes various kinds of processes by judging commands on the basis of a signal from a remote controller 41 and an operation key 42. The sub-TV is driven by a battery 43. However, the sub-TV may be driven by utilizing an outlet power source.

With such the broadcast receiving apparatus formed of the main TV and the sub-TV, it is possible to view the broadcast both on the main TV and the sub-TV without equipping the sub-TV with a tuner. The main TV is provided with a plurality of tuners and selects output of an arbitrary tuner by the matrix switch 8, so that it is possible to view on the sub-TV a program other than the program being received on the main TV. Furthermore, as described above, electric power supply control to each circuit is performed in the main TV, so that it is possible to view television on the sub-TV, even if the main TV is turned off (even if in the stand-by state). Moreover, when the main TV is turned off and the sub-TV is also turned off, electric power supply from the power source B is stopped. Accordingly, unnecessary electric power consumption is prevented. On the other hand, also in such the state, the power source A maintains operations of the controller 3 and the communication part. Therefore, in a case where the sub-TV is turned on again after the sub-TV was turned off, the controller 3 determines that the sub-TV is turned on again, so that it is possible to resume electric power supply from the power source B.

Figure 1:
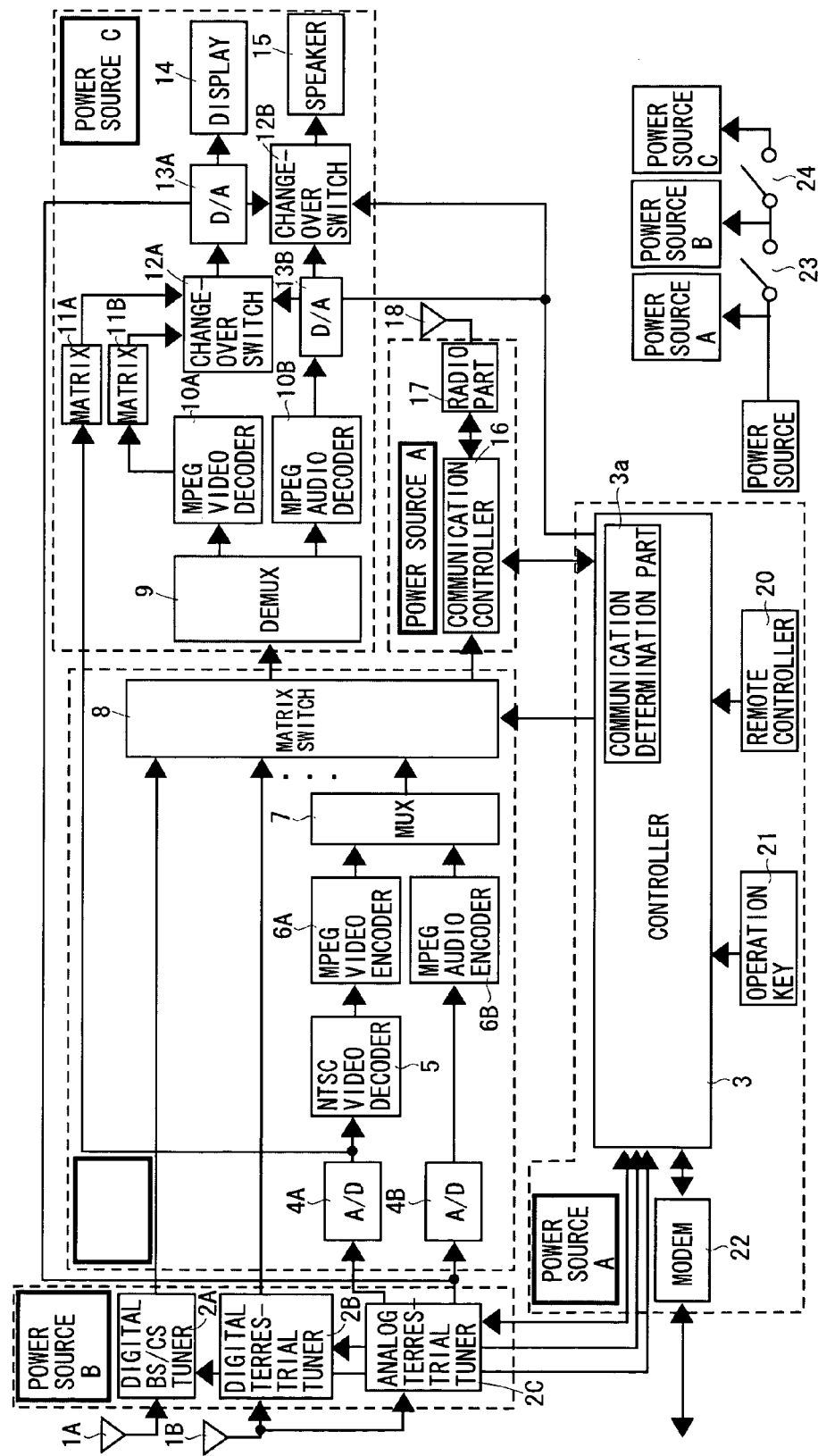
FIG. 1 is a block diagram showing structure of a main television in a broadcast receiving system according to an embodiment of the present invention.
Figure 2:
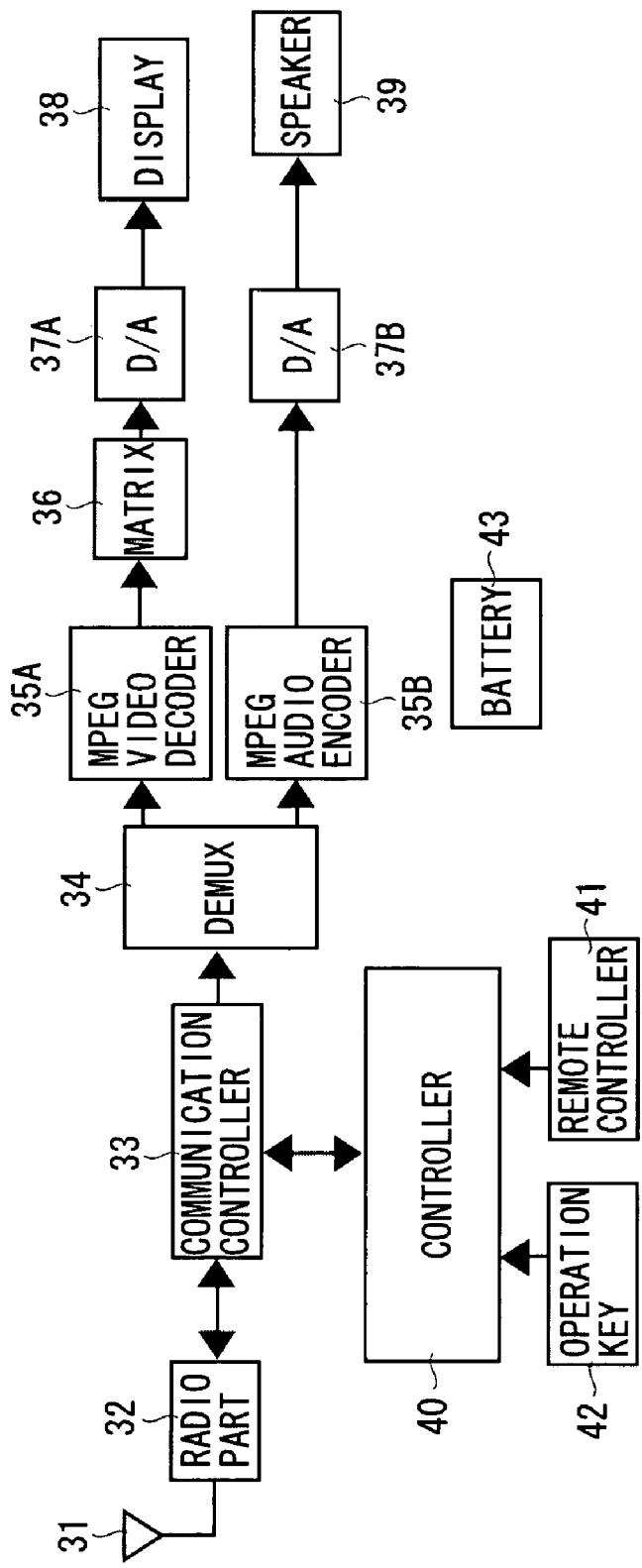
FIG. 2 is a block diagram showing structure of a sub-television in the broadcast receiving system according to an embodiment of the present invention.

What is claimed is:
1. A broadcast receiving system, formed of
   a main television unit provided with a receiving part for receiving broadcast wave, a signal processing part for generating at least a video signal based on the received broadcast wave, a display for displaying a video based on the video signal, and a section for generating at least a transmission radio wave of a video based on the received broadcast wave;
   a sub-television unit provided with a receiving part for receiving the transmission radio wave, a signal processing part for generating at least a video signal based on the received transmission radio wave, and a display for displaying a video based on the video signal; and
   a controller provided independently of the sub-television unit to control the main television unit without controlling the sub-television unit, wherein
   the sub-television unit is provided with a section for transmitting information indicating an TV on-state of the sub-television unit by wireless, on the other hand, the main television unit is provided with a section for receiving the information indicating the TV on-state of the sub-television unit by wireless, and
   the main television unit performs control based on first information from the controller and second information from the sub-television unit, and stops displaying the video on the display thereof, but continues a broadcast reception process, a transmission radio wave generation process, and a reception process of sub-television information when receiving the information indicating a TV off-state of the main television unit as the first information at the time of receiving the information indicating the TV on-state as the second information.

2. A broadcast receiving system according to claim 1, wherein the main television unit stops the broadcast reception process and the transmission radio wave generation process, while continuing the reception process of sub-television information by wireless, when the main television is turned off and the information indicating the TV on-state of the sub-television unit is not received.

3. A broadcast receiving system according to claim 1, wherein the main television unit includes a plurality of power sources, and the power source used for supplying electric power to a power consumption element related to each of the processes stops electric power supply to the power consumption element when the processes are stopped.

4. A broadcast receiving system according to claim 1, wherein the main television unit is provided with a plurality of tuners in the receiving part, and further provided with a selection section capable of inputting output signals from each of the tuners and outputting the signals from an arbitrary output terminal or inputting signals generated on the basis of the output signals and outputting the signals from an arbitrary output terminal, and signals selected for the sub-television unit by the selection section is output as the transmission radio wave.

5. A broadcast receiving system according to claim 2, wherein the main television unit includes a plurality of power sources, and the power source used for supplying electric power to a power consumption element related to each of the processes stops electric power supply to the power consumption element when the processes are stopped.

6. A broadcast receiving system according to claim 2, wherein the main television unit is provided with a plurality of tuners in the receiving part, and further provided with a selection section capable of inputting output signals from each of the tuners and outputting the signals from an arbitrary output terminal or inputting signals generated on the basis of the output signals and outputting the signals from an arbitrary output terminal, and signals selected for the sub-television unit by the selection section is output as the transmission radio wave.

7. A broadcast receiving system according to claim 3, wherein the main television unit is provided with a plurality of tuners in the receiving part, and further provided with a selection section capable of inputting output signals from each of the tuners and outputting the signals from an arbitrary output terminal or inputting signals generated on the basis of the output signals and outputting the signals from an arbitrary output terminal, and signals selected for the sub-television unit by the selection section is output as the transmission radio wave.

* * * * *